US009600323B2

(12) United States Patent
Kekeh et al.

(10) Patent No.: US 9,600,323 B2
(45) Date of Patent: *Mar. 21, 2017

(54) STORING AND RESUMING APPLICATION RUNTIME STATE

(71) Applicant: Microsoft Technology Licensing, LLC, Redmond, WA (US)

(72) Inventors: Charles Kekeh, Melrose, CA (US); Aseem Kohli, Mansfield, MA (US); Scott Elliot Stearns, Ludlow, VT (US); Kristofer Hellick Reierson, Acton, MA (US); Cread Wellington Mefford, Malden, MA (US); Angela Mele Anderson, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,806

(22) Filed: Dec. 17, 2015

(65) Prior Publication Data

US 2016/0103701 A1   Apr. 14, 2016

Related U.S. Application Data

(63) Continuation of application No. 12/979,366, filed on Dec. 28, 2010, now Pat. No. 9,223,611.

(51) Int. Cl.
*G06F 9/46* (2006.01)
*G06F 3/00* (2006.01)
(Continued)

(52) U.S. Cl.
CPC .......... *G06F 9/461* (2013.01); *G06F 9/46* (2013.01); *G06F 9/48* (2013.01); *G06F 9/485* (2013.01);
(Continued)

(58) Field of Classification Search
None
See application file for complete search history.

(56) References Cited

U.S. PATENT DOCUMENTS

| 6,763,370 B1 | 7/2004 | Schmeidler et al. |
| 6,848,106 B1 | 1/2005 | Hipp |

(Continued)

FOREIGN PATENT DOCUMENTS

| CN | 101459690 | 6/2009 |
| CN | 101561780 | 10/2009 |

(Continued)

OTHER PUBLICATIONS

Al-Bar, et al., "Camel: a mobile applications framework", Retrieved at<<http://ieeexplore.ieee.org/stamp/stamp.jsp?arnumber= 01243048 >>, Computer Networks and Mobile Computing, 2003. ICCNMC 2003. 2003 International D Conference, Oct. 20-23, 2003, pp. 10.

(Continued)

*Primary Examiner* — Charles Swift
(74) *Attorney, Agent, or Firm* — Lee & Hayes, PLLC

(57) ABSTRACT

Execution of an application is suspended and the runtime state of the application is collected and persisted. Maintenance operations may then be performed on the computer that the application was executing upon. The runtime state might also be moved to another computer. In order to resume execution of the application, the runtime state of the application is restored. Once the runtime state of the application has been restored, execution of the application may be restarted from the point at which execution was suspended. A proxy layer might also be utilized to translate requests received from the application for resources that are modified after the runtime state of the application is persisted.

20 Claims, 8 Drawing Sheets

(51) Int. Cl.
*G06F 9/44* (2006.01)
*G06F 13/00* (2006.01)
*G06F 9/48* (2006.01)
*G06F 9/50* (2006.01)

(52) U.S. Cl.
CPC .......... *G06F 9/4806* (2013.01); *G06F 9/4843* (2013.01); *G06F 9/4856* (2013.01); *G06F 9/50* (2013.01); *G06F 9/5005* (2013.01); *G06F 9/5083* (2013.01); *G06F 9/5088* (2013.01)

(56) References Cited

U.S. PATENT DOCUMENTS

| | | | |
|---|---|---|---|
| 6,938,096 | B1 | 8/2005 | Greschler et al. |
| 7,017,188 | B1 | 3/2006 | Schmeidler et al. |
| 7,028,305 | B2 | 4/2006 | Schaefer |
| 7,200,632 | B1 | 4/2007 | Greschler et al. |
| 7,225,264 | B2 | 5/2007 | Croman et al. |
| 7,426,661 | B2 | 9/2008 | Schaefer |
| 7,451,451 | B2 | 11/2008 | Schaefer |
| 7,574,591 | B2 | 8/2009 | Downer et al. |
| 7,590,743 | B2 | 9/2009 | Willis |
| 7,690,039 | B2 | 3/2010 | Schmeidler et al. |
| 7,707,641 | B2 | 4/2010 | Schmeidler et al. |
| 7,730,169 | B1 | 6/2010 | Greschler et al. |
| 7,797,372 | B2 | 9/2010 | Greschler et al. |
| 7,797,576 | B2 | 9/2010 | Craft et al. |
| 8,195,774 | B2 * | 6/2012 | Lambeth .......... H04L 29/12839 709/220 |
| 8,539,488 | B1 * | 9/2013 | Havemose ............ G06F 9/4856 718/100 |
| 2004/0123288 | A1 * | 6/2004 | Bennett ............... G06F 9/45558 718/1 |
| 2004/0133891 | A1 * | 7/2004 | Dahlstedt ............. G06F 9/4843 718/100 |
| 2004/0143669 | A1 * | 7/2004 | Zhao ....................... H04L 29/06 709/228 |
| 2005/0050545 | A1 | 3/2005 | Moakley |
| 2005/0066037 | A1 * | 3/2005 | Song ................. G06F 17/30861 709/227 |
| 2005/0081212 | A1 | 4/2005 | Goud et al. |
| 2005/0120341 | A1 | 6/2005 | Blumenthal et al. |
| 2005/0273785 | A1 * | 12/2005 | Kass ..................... G06F 9/4843 718/100 |
| 2007/0118499 | A1 | 5/2007 | Hwang et al. |
| 2009/0113444 | A1 * | 4/2009 | Hackborn ............... G06F 9/461 719/312 |
| 2009/0119649 | A1 | 5/2009 | Jegoulev et al. |
| 2009/0158099 | A1 * | 6/2009 | Cui ..................... G06F 11/0748 714/57 |
| 2009/0292858 | A1 | 11/2009 | Lambeth et al. |
| 2010/0005474 | A1 | 1/2010 | Sprangle et al. |
| 2010/0042719 | A1 * | 2/2010 | Kinoshita ............. G06F 3/0605 709/225 |
| 2010/0070726 | A1 * | 3/2010 | Ngo .................... G06F 11/1464 711/162 |
| 2010/0115080 | A1 * | 5/2010 | Kageyama ........ H04L 29/12028 709/223 |
| 2010/0115334 | A1 * | 5/2010 | Malleck .................. G06F 9/485 714/15 |
| 2010/0169537 | A1 * | 7/2010 | Nelson ................ G06F 9/45558 711/6 |
| 2010/0223498 | A1 | 9/2010 | Schlesinger et al. |
| 2010/0250824 | A1 * | 9/2010 | Belay ................. G06F 9/45558 711/6 |
| 2011/0023036 | A1 * | 1/2011 | Humphreys .......... G06F 9/5027 718/100 |
| 2011/0320556 | A1 * | 12/2011 | Reuther ................ G06F 9/4856 709/213 |
| 2012/0167117 | A1 | 6/2012 | Kekeh et al. |

FOREIGN PATENT DOCUMENTS

| | | |
|---|---|---|
| JP | 2002304383 | 10/2002 |
| JP | 2004246702 | 9/2004 |
| JP | 2010015474 | 1/2010 |

OTHER PUBLICATIONS

Ari, et al., "Providing session management as core business service", Retrieved at <<http:/fwww2007.org/posters/poster1009.pdf >>, Proceedings of the 16th international conference on World Wide Web, May 8-12, 2007, pp. 2.

Chinese Office Action mailed Nov. 16, 2015 for Chinese patent application No. 201110448219.4, a counterpart foreign application of U.S. Appl. No. 12/979,366, 6 pages.

Translated Chinese Office Action mailed Jul. 1, 2015 for Chinese patent application No. 201110448219.4, a counterpart foreign application of U.S. Appl. No. 12/979,366, 11 pages.

"Execution model overview", Retrieved at << http://msdn.microsofl.com/en-us/library/ff817008(VS.92).aspx>>,Mar. 9, 2010, pp. 6.

"International Preliminary Report on Patentability Issued in PCT Patent Application No. PCT/US2011/067412", Mailed Date: Jul. 11, 2013; 6 Pages.

International Search Report, mailed date—Jul. 31, 2012, Application No. PCT/US2011/067412, filed date—Dec. 27, 2011, pp. 9.

Nanba, et al., "Design of a Function to Store and Restore Process State including InterProcess Communication on Tender", In IPSJ SIG Technical Report, Jan. 31, 2008, 12 Pages.

"Notice of Allowance Issued in U.S. Appl. No. 12/979,366", Mailed Date: Aug. 28, 2015, 9 Pages.

Final Office Action Issued in U.S. Appl. No. 12/979,366, Mailed Date: Jul. 19, 2013, 18 Pages.

"Non-Final Office Action Issued in U.S. Appl. No. 12/979,366", Mailed Date: Nov. 5, 2012, 14 Pages.

Office action for U.S. Appl. No. 12/979,366, mailed on Dec. 18, 2014, Anderson et al., "Stording and Resuming Application Runtime State", 29 pages.

"Office Action Issued in Japanese Patent Application No. 2013-547619", Mailed Date: Dec. 22, 2015, 7 Pages.

"Non-Final Office Action Issued in U.S. Appl. No. 12/979,366", Mailed Date: Dec. 4, 2013, 18 Pages.

Office Action and Search Report for Chinese Patent Application No. 201110448219.4; mailed Feb. 3, 2015; 14 pages.

Office action for U.S. Appl. No. 12/979,366, mailed on Jun. 20, 2014, Anderson et al., "Stording and Resuming Application Runtime State", 28 pages.

"Office and Search Report Issued in Taiwan Patent Application No. 100142414", Mailed Date: Aug. 27, 2015, 7 Pages.

Pan, et al., "Controlling program execution through binary instrumentation". Retrieved at <<http://www.mit.edu/-xoxo/pin-wbia05.pdf >>,Newsletter ACM SIGARCH Computer Architecture News—Special issue on the 2005 workshop on binary instrumentation and application, vol. 33, No. 5, Dec. 2005, pp. 6.

\* cited by examiner

STORING AND RESUMING APPLICATION RUNTIME STATE

RELATED APPLICATIONS

This application claims priority to U.S. patent application Ser. No. 12/979,366, filed on Dec. 28, 2010, and issued as U.S. Pat. No. 9,223,611, on Dec. 29, 2015, which is expressly incorporated herein by reference in its entirety.

BACKGROUND

Maintenance of server computers in a server farm can be difficult for many reasons. For instance, when an information technology ("IT") administrator needs to perform maintenance operations on a server computer, it is typically necessary to close all users sessions before the operating system running on the server computer can be shut down. In order to properly close the user sessions, the IT administrator must shut down all of the user applications executing in the sessions. Unsaved data may be lost if the users are not able to shut down their applications in an orderly fashion. Loss of data in this way is extremely frustrating to both the user and the IT administrator.

It is with respect to these and other considerations that the disclosure made herein is presented.

SUMMARY

Technologies are described herein for storing and resuming the runtime state of an application. Through an implementation of the concepts and technologies disclosed herein, the runtime state of an executing application can be captured and saved independently from the runtime state of the operating system upon which the application is executing. Maintenance operations can then be performed on the computer upon which the application was executing. The runtime state of the application might also be moved to another computer in order to load balance the processing load of the computer. Once the maintenance operations have been completed, the runtime state of the application can be restored and execution of the application can be resumed to the state that the application was in at the time the runtime state was captured. In this manner, maintenance operations can be performed without losing unsaved application data.

According to one aspect presented herein, a request is received to store the runtime state of an application executing on a computer. For instance, an IT administrator may make such a request. In response to receiving such a request, execution of the application is suspended, and the runtime state of the application is collected independently of the operating system upon which it is executing. The runtime state might include the contents of physical and virtual memory, central processing unit ("CPU") registers, and instruction pointers. The runtime state might also include the state of system resources, user interface ("UI") resources, and network connections. The runtime state might also include any file resources in use by the application when the runtime state is collected. Once the runtime state has been collected, the runtime state is persisted, such as by saving the runtime state to a mass storage device.

After the runtime state has been persisted, maintenance operations may be performed on the computer on which the application was executing. For instance, maintenance operations may be performed on the hardware of the computer or upon the operating system upon which the application was executing. Additionally, the runtime state of the application may be moved to another computer. This may be desirable, for instance, in order to load balance the processing load of the computer upon which the application was executing.

Once the maintenance operations have been completed, a request may be received to restart execution of the application, such as from an IT administrator. In order to restart the execution of the application, the runtime state of the application is restored. For instance, the contents of memory, registers, and instruction pointers may be restored. The state of system resources, UI resources, and network connections might also be restored. If file resources were included in the runtime state, the file resources might also be restored. Once the runtime state of the application has been restored, execution of the application may be restarted from the point at which it was suspended. In this manner, the application may be returned to the state the application was in at the time the execution of the application was suspended.

According to another aspect, a proxy layer is provided for translating requests received from the application for resources that are modified after the runtime state of the application is persisted. For instance, if an application utilized a network port number just prior to the capture of the application state that is unavailable when execution of the application is resumed, the proxy layer will translate between the network port number known to the application and a new network port number. Other types of translations might also be performed for other types of resources having a changed name, number, location, or other identifying information.

It should be appreciated that the embodiments disclosed herein may be utilized in conjunction with virtualized applications, non-virtualized applications executing in a hardware virtualized environment, non-virtualized applications executing in a non-virtualized environment, and other types of applications. It should also be appreciated that this Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
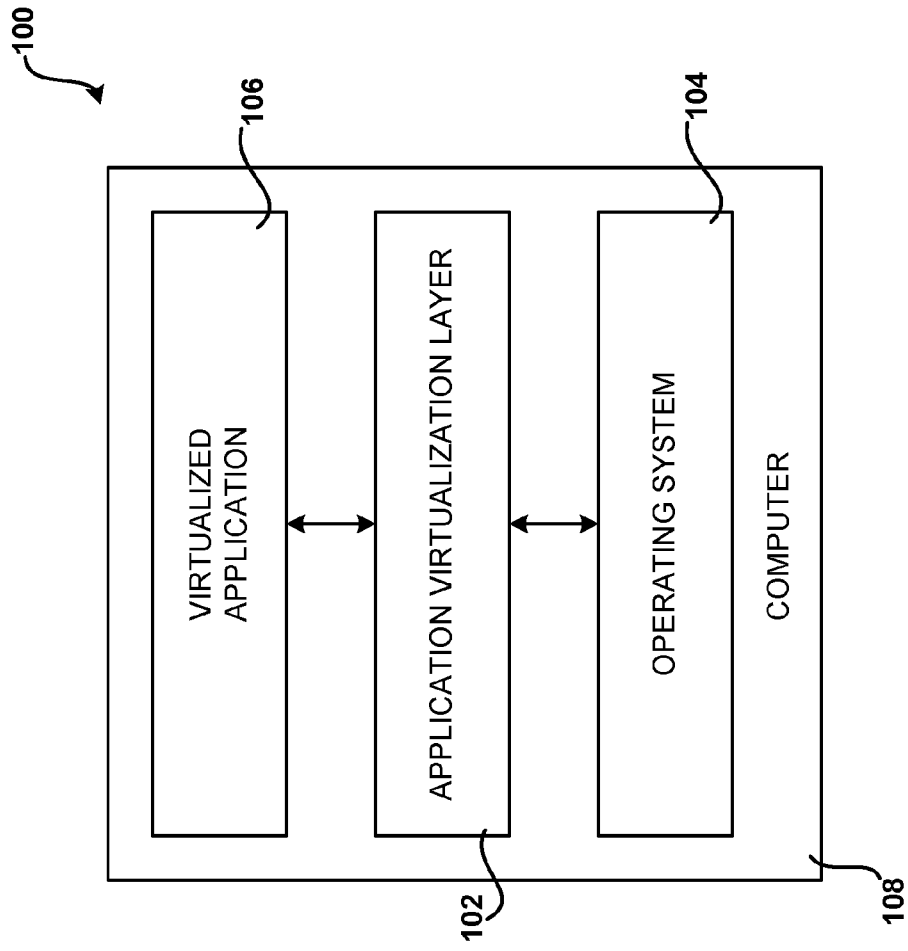
FIG. 1 is a computer software architecture diagram showing one illustrative operating environment for the embodiments disclosed herein.

The following detailed description is directed to technologies for storing and resuming application runtime state. As discussed briefly above, the runtime state of an executing application can be captured and saved independently from the runtime state of the operating system upon which the application is executing. Maintenance operations can then be performed on the operating system or the computer upon which the application was executing. The runtime state of the application might also be moved to another computer in order to load balance the processing load of the computer. The runtime state of the application may then be restored. Once the runtime state of the application has been restored, execution of the application may be restarted from the point at which execution was suspended. A proxy layer might also be utilized to translate requests received from the application for resources that are modified after the runtime state of the application is persisted. Additional details regarding these and other features will be provided below with regard to FIGS. 1-9.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for storing and resuming the runtime state of an application will be described.

FIG. 1 is a software and network architecture diagram showing one illustrative operating environment 100 for the embodiments disclosed herein. The illustrative operating environment 100 shown in FIG. 1 includes a computer 108 configured to provide an environment for executing a virtualized application 106, which may be referred to herein as "the application 106." In order to provide this functionality, the computer 108 includes an operating system 104 and an application virtualization layer 102. The computer 108 may be a standard desktop or laptop computer, a server computer, a tablet computer, a smartphone, or any other type of computing device capable of performing the operations presented herein for storing and resuming application runtime state.

The application virtualization layer 102 is a software component configured to provide an application virtualization environment. In this regard, the application virtualization layer 102 is configured to execute the application 106. The application virtualization layer 102 provides functionality for encapsulating the execution of the application 106 from the operating system 104. The application virtualization layer 102 might also provide functionality for encapsulating execution of the application 106 from other application programs and system resources of the computer 108. For instance, the application virtualization layer 102 might virtualize resources of the operating system 104 or the computer 108. When the application 106 attempts to access the actual resources, the application virtualization layer 102 presents a virtualized resource to the application 106 for use. In this manner, the application 106 can be executed in a manner that does not impact the actual resources exposed by the operating system 104 or the computer 108.

According to other aspects, the application virtualization layer 102 provides functionality for loading portions of the application 106 from a server computer (not shown) on-demand. In particular, the application virtualization layer 102 may operate in conjunction with a server component to stream needed portions of the application 106 from a server to the computer 108. In this manner, the application 106 can be accessed at the computer 108 on demand. Moreover, because only needed portions of the application 106 may be streamed from the server to the computer 108, access to the application 106 may be provided without transmitting the entire application 106 from the server to the computer 108. Additional details regarding the functionality of the application virtualization layer 102 can be found in U.S. Pat. No. 7,225,264, filed May 29, 2007 and entitled "Systems and Methods for Delivering Content over a Computer Network," U.S. Pat. No. 7,200,632, filed Apr. 3, 2007 and entitled "Method and System for Serving Software Applications to Client Computers," U.S. Pat. No. 7,451,451 filed Nov. 11, 2008, and entitled "Operating System Abstraction and Protection Layer," and U.S. Pat. No. 7,797,372 filed Sep. 14, 2010 and entitled "Serving Software Applications from Servers for Client Computers," each of which is expressly incorporated herein by reference in its entirety.

It should be appreciated that while the embodiments disclosed herein are primarily presented in the context of storing and resuming the runtime state of a virtualized application 106, the embodiments disclosed herein may be utilized with other types of applications. For instance, the embodiments disclosed herein might be utilized to store and resume a non-virtualized application executing in a hardware virtualization environment. The embodiments disclosed herein might also be utilized in conjunction with an application executing in a non-virtualized environment. The embodiments disclosed herein might also be utilized in conjunction with applications executing in other types of environments known to those skilled in the art. Additional details regarding the technologies disclosed herein for storing and resuming the runtime state of an application 106 will be provided below with regard to FIGS. 2-9.

Figure 2:
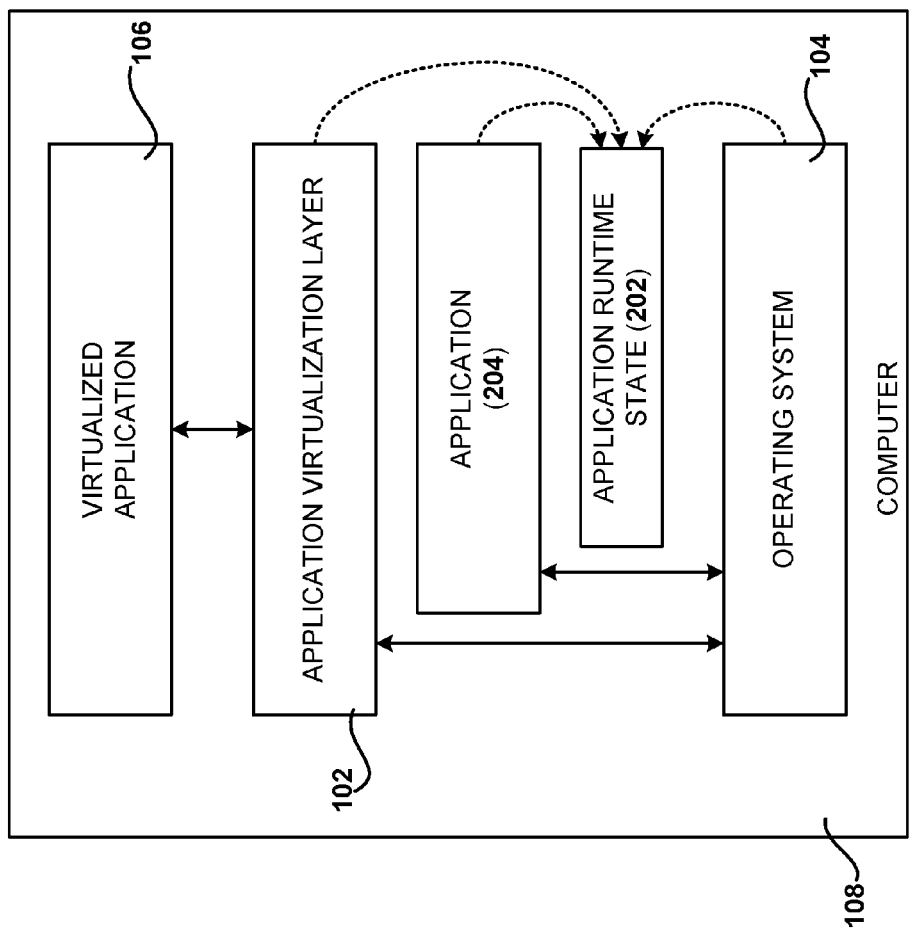
FIG. 2 is a computer software architecture diagram showing aspects of several software components disclosed herein for storing and resuming the runtime state of an application, according to one embodiment disclosed herein.

FIG. 2 is a computer software architecture diagram showing aspects of several software components disclosed herein for storing and resuming the runtime state of an application 106, according to one embodiment disclosed herein. In particular, FIG. 2 illustrates several software components that may be configured in embodiments to capture, persist, and restore the runtime state 202 of an application 106. The runtime state 202 is data that defines the current execution context of the application 106. As will be discussed in greater detail below, the runtime state 202 can be captured, persisted, and restored at a later time. In this manner, maintenance operations can be performed on the computer 108 and the operating system 104 without requiring the application 106 to be shut down.

As also illustrated in FIG. 2, a number of different software components may be utilized to capture, persist, and restore the runtime state 202. For instance, in one implementation the application virtualization layer 102 may be configured to perform the operations disclosed herein for capturing, persisting, and restoring the runtime state 202. In another embodiment, the operating system 104 is configured to generate and restore the runtime state 202. In yet another implementation, an application 204 may be configured to generate the runtime state 202 for the application 106. It should be appreciated that, in the various embodiments kernel drivers or other types of low level program code may be installed on operating system 104 by the application 204 or the application virtualization 102 to enable various aspects of the functionality described herein. Other types of implementations may be apparent to those skilled in the art.

As will be described in greater detail below, generation of the runtime state 202 for a virtualized application 106 can be performed in response to a request, such as from an IT administrator. In response to such a request, the execution of the application 106 is suspended. Additionally, resources in use by the application 106 are enumerated, the current state of the resources are captured, and data defining the state is persisted as the runtime state 202. As will be described in greater detail below, the runtime state 202 may be retrieved from storage at a later time in order to recreate the execution context of the application 106. Additionally, the runtime state 202 may be moved to a computer other than the computer 108 and restarted. Additional details regarding this functionality will be provided below.

In order to restore an application 106 to its previous state, the stored runtime state 202 is utilized to recreate the various processes of the application 106 and to restore the contents of memory utilized by the application 106. Other system, file, and UI resources may also be recreated. Additionally, according to one implementation, a proxy layer is utilized to translate requests from the application 106 to resources that have been modified after the runtime state 202 has been created. Once the runtime state 202 has been restored, the execution of the application 106 can be restarted. Additional details regarding these operations are provided below with respect to FIGS. 3-8.

It should be appreciated that although FIG. 2 illustrates the creation of a runtime state 202 for a single application 106, the embodiments disclosed herein may be utilized to create a runtime state 202 for multiple applications 106 simultaneously. For instance, a runtime state 202 may be generated utilizing the concepts presented herein in order to capture the execution context of multiple applications at the same time. The stored runtime state 202 may then be utilized to resume execution of the multiple applications simultaneously.

As also mentioned above, it should be appreciated that although the embodiments disclosed herein are primarily described in the context of generating a runtime state 202 for a virtualized application 106, the embodiments presented herein may be utilized with other types of applications. For instance, the embodiments disclosed herein may be utilized with non-virtualized applications executing in a hardware-virtualized environment, non-virtualized applications executing in a non-virtualized environment, and other types of applications. It should also be appreciated that the runtime state 202 is generated independently of the execution state of the operating system 104. In this manner, the runtime state 202 can be migrated to another computer, potentially executing a different version of the operating system 104, and restored to its original state.

Figure 3:
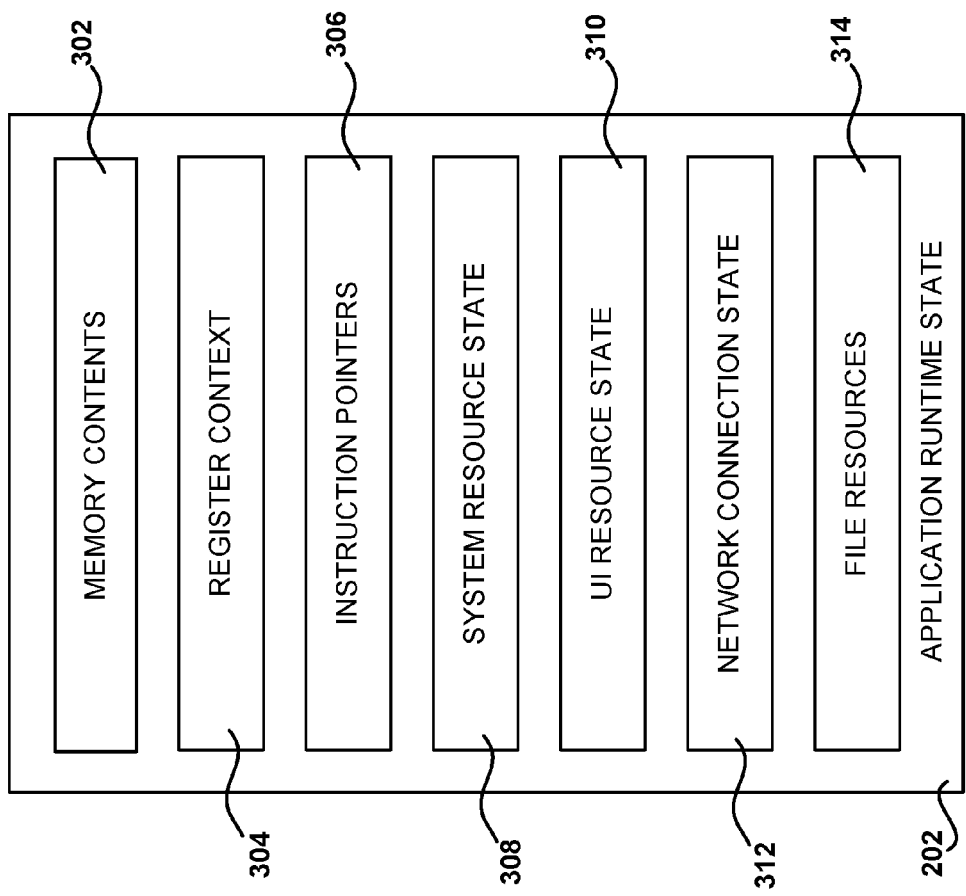
FIG. 3 is a data structure diagram showing the contents of a stored application runtime state utilized in one embodiment disclosed herein.

FIG. 3 is a data structure diagram showing the contents of a stored application runtime state 202 (which may be referred to herein as "the runtime state 202") utilized in one embodiment disclosed herein. As shown in FIG. 3, the application runtime state 202 includes memory contents 302. Memory contents 302 are the contents of any virtual, shared, physical, or other memory used by the application 106. The application runtime state 202 also includes the register context 304. The register context 304 is the contents of any registers in a CPU of the computer 108 on which the application 106 is executing. The register context 304 might also include instruction pointers 306 for each thread, or process, of the application 106.

In one implementation, the application runtime state 202 also includes the system resource state 308. The system resource state 308 is data that defines the state of a set of system resources that are in use by the application 106 at the time the execution of application 106 is suspended. The system resource state 308 might include data defining the state of handles opened by the application 106 to registry keys, handles opened to kernel objects, files on a local file system or network shares, TCP ports in use by the application 106, as well as connections opened by the application 106 to remote resources. The system resource state 308 might also include data defining other types of system resources in use by the application 106 at the time the application 106 is suspended.

According to one implementation, the application runtime state 202 also includes the UI resource state 310. The UI resource state 310 includes data defining UI elements in use by the application 106 at the time the application 106 is suspended. For instance, the UI resource state 310 might define the location of UI windows, relationships between UI components, window handles, and data defining the state of other types of UI resources.

According to one implementation, UI creation operations performed by the application 106 are logged during the execution of the application 106. Data defining the logged UI creation operations may be stored in the application runtime state 202 and utilized at the time the application 106 is restarted to recreate the UI presented by the application 106 at the time the application is suspended. It should be appreciated that other types of mechanisms might also be utilized to generate a UI resource state 310 that can be utilized to recreate the UI elements presented by the application 106 at the time the application 106 is restarted.

The application runtime state 202 might also include the network connection state 312. The network connection state 312 is data that defines the status of any network connections utilized by the application 106 at the time the application 106 is suspended. The network connection state 312 may define, for instance, handles to local network resources, network ports, and other network related data.

In one implementation, all file resources in use by the application 106 at the time its execution is suspended are available under the same names on the local file system when the application 106 is restored. In other implementations, however, file resources 314 in use by the application 106 are bundled as an addition to the application runtime state 202. The file resources 314 might also include the value of seek pointers to the various file resources 314. As will be discussed in greater detail below, the bundled file resources 314 might be utilized at the time the runtime state 202 is recreated in order to present the file resources 314 to the application 106.

It should be appreciated that the contents of the application runtime state 202 illustrated in FIG. 3 are merely illustrative. According to various implementations, other data might also be included in the application runtime state 202. In general, however, it should be appreciated that the application runtime state 202 includes the data necessary to recreate the execution context of the application 106 such that the application 106 can be resumed at a later point in time. Additional details regarding the creation and use of the application runtime state 202 will be provided below with respect to FIGS. 4-5.

Figure 4:
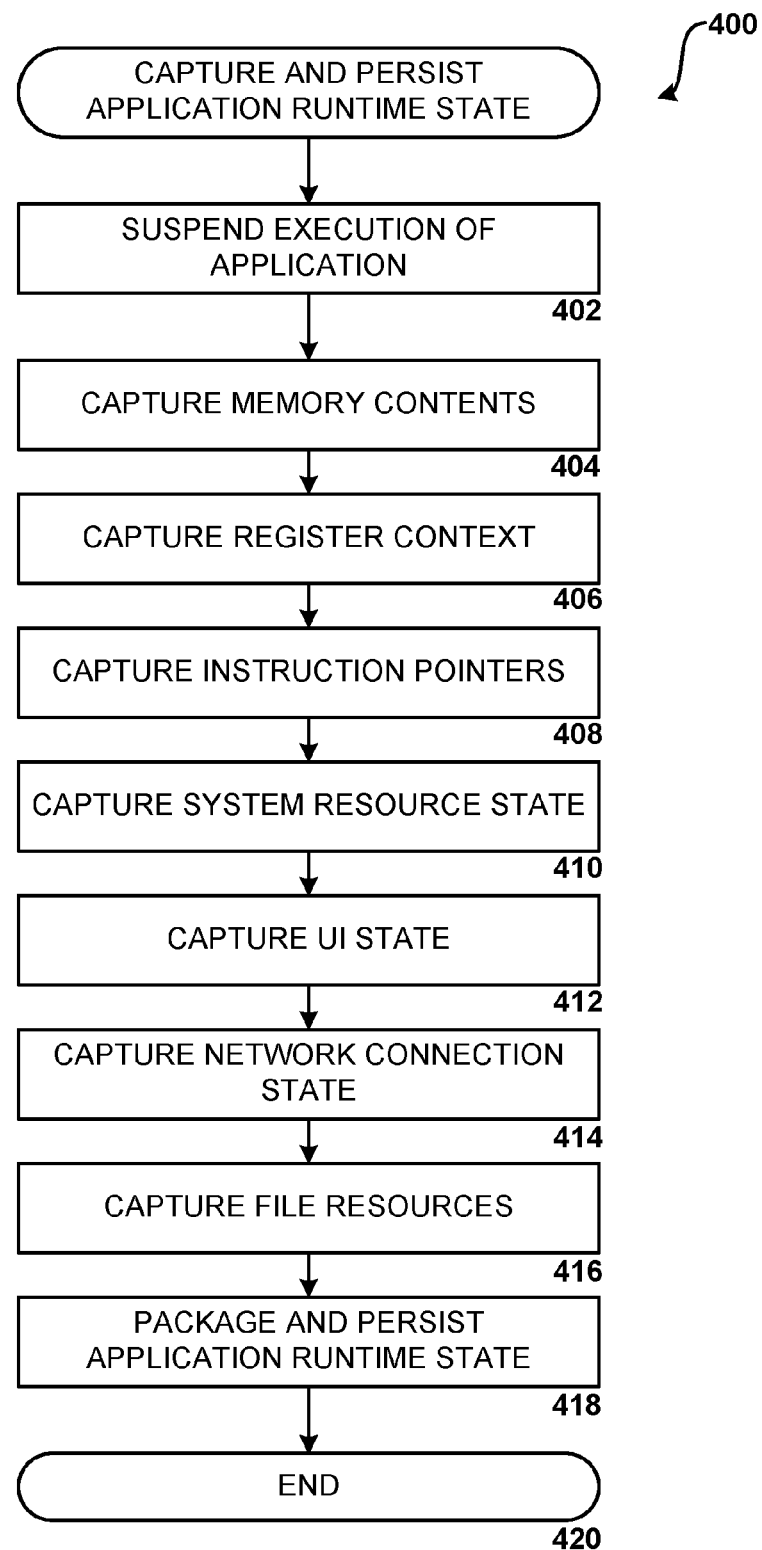
FIG. 4 is a flow diagram showing aspects of one illustrative process disclosed herein for capturing and persisting the runtime state of an application, according to one embodiment presented herein.

FIG. 4 is a flow diagram showing aspects of one illustrative routine 400 disclosed herein for capturing and persisting the runtime state 202 of an application 106, according to one embodiment presented herein. It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the execution of the application 106 is suspended. In particular, the execution of every thread in the application process is suspended. Once the application 106 has been suspended, the routine 400 proceeds to operation 404 where the memory contents 302 are captured. As discussed above, the memory contents 302 include the contents of all physical, virtual, and other types of memory in use by the application 106. The memory contents 302 are stored in the application runtime state 202.

From operation 404, the routine 400 proceeds to operation 406 where the register context 304 is captured and stored in the application runtime state 202. As discussed above, the register context 304 is the contents of the registers of one or more CPUs or CPU cores of the computer 108 on which the application 106 is executed. Once the register context 304 has been captured and stored in the application runtime state 202, the routine 400 proceeds to operation 408.

At operation 408, the instruction pointers 306 are captured and stored in the application runtime state 202. The routine 400 then proceeds to operation 410 where the system resource state 308 is captured and stored in the application runtime state 202. As discussed above, the system resource state 308 includes data identifying the resources in use by the application 106. For instance, the system resource state 308 may include handles opened by the application 106 to registry keys, handles opened to kernel objects, files on a local file system or network shares, TCP ports in use by the application 106, connections opened by the application 106 to remote resources, and/or data identifying the state of other type of system resources.

From operation 410, the routine 400 proceeds to operation 412 where the UI resource state 310 is captured and stored. As discussed above, the UI resource state 310 is data that defines the state of any UI elements displayed by the application 106. The UI resource state 310 may include handles to windows or other UI objects, log data for recreating the UI resources at the time the application 106 is restarted, and other types of information. From operation 412, the routine 400 proceeds to operation 414.

At operation 414 the network connection state 312 is captured and stored in the runtime state 202. As discussed above, the network connection state 312 defines the state of any network connections opened by the application 106 at the time the application is suspended. The routine 400 then proceeds to operation 416 where file resources 314 in use by the application 106 may also be identified and stored in the runtime state 202. As discussed above, in some implementations the file resources 314 are not included in the runtime state 202. However, in other implementations, any file resources 314 and their associated seek pointers are stored in the runtime state 202. As will be described in greater detail below, the file resources 314 can be recreated prior to restarting execution of the application 106.

Once the memory contents 302, register context 304, instruction pointers 306, system resource state 308, UI resource state 310, network connection state 312, and possibly file resources 314 have been captured, the routine 400 proceeds to operation 418. At operation 418, the runtime state 202 is packaged and persisted. For instance, the runtime state 202 may be persisted to a mass storage device accessible to the computer 108. Alternately, the runtime state may be persisted to a network location accessible to the computer 108. From operation 418, the routine 400 proceeds to operation 420, where it ends.

Figure 5:
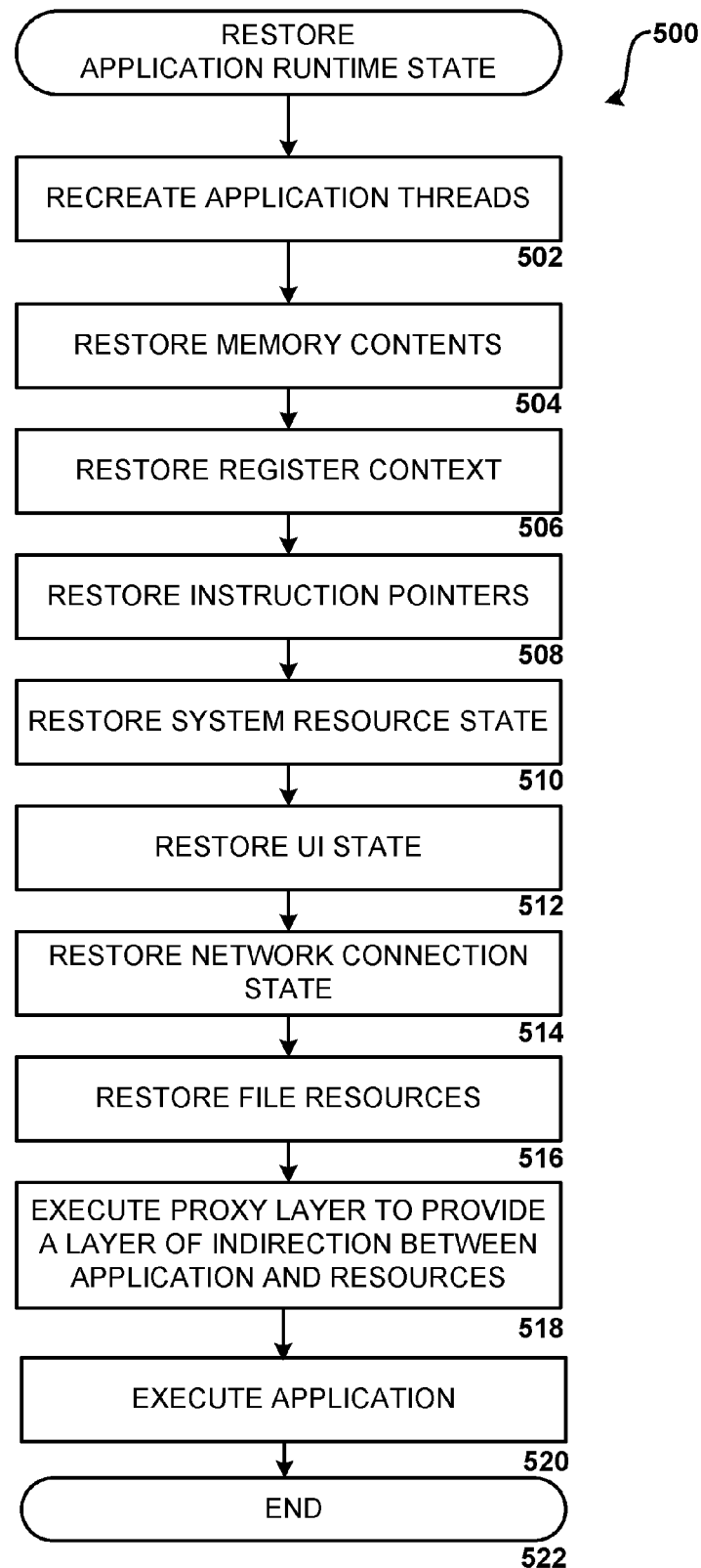
FIG. 5 is a flow diagram showing aspects of one illustrative process disclosed herein for restoring the captured and persisted runtime state of an application, according to one embodiment presented herein.

FIG. 5 is a flow diagram showing aspects of one illustrative routine 500 disclosed herein for restoring the previously captured and persisted runtime state 202 of an application 106, according to one embodiment presented herein. The routine 500 begins at operation 502, where the threads of the application 106 are recreated. Once the threads have been recreated, the routine 500 proceeds to operation 504 where the contents of memory is restored utilizing the memory contents 302 stored in the runtime state 202. Once the contents of memory have been restored, the routine 500 proceeds to operation 506 where the contents of CPU registers are restored utilizing the register context 304 stored in the runtime state 202. The instruction pointers are also restored at operation 508.

From operation 508, the routine 500 proceeds to operation 510 where the state of system resources are restored utilizing the system restore state 308. Some system resources may be accessed indirectly through handle tables. In those cases, all handles to the system resources are reopened and layer of indirection is inserted between the application 106 and the handle table so that the indexed accesses by the application after it resumes are redirected to actual resources behind the open handles. Additional details regarding this process will be provided below with reference to FIG. 6.

From operation 510, the routine 500 proceeds to operation 512 where the state of any UI elements displayed by the application 106 at the time of its suspension are restored. As discussed briefly above, this may include replaying a log of UI creation commands in order to restore the UI. Because UI elements are often referred to by handles, a layer of indirection may also be needed between the application 106 and the UI resources. Details regarding this process will be provided below with reference to FIG. 6. From operation 512, the routine 500 proceeds to operation 514.

At operation 514, the state of any network connections opened by the application 106 at the time of its suspension are restored utilizing the network connection state 312 stored in the runtime state 202. As will be described in greater detail below with reference to FIG. 6, a layer of indirection may also be needed to provide the application 106 access to previously opened port numbers. Once the network connection state has been restored at operation 514, the routine 500 proceeds to operation 516.

At operation 516 any file resources 314 stored in the runtime state 202 are restored. Seek pointers on file streams opened by the application 106 are also restored so that the application 106 can resume reading from the offsets that were current at the time the application 106 was suspended. File resources 314 stored at the runtime state 202 may be restored at their named locations before handles are opened to the file resources and the application 106 is resumed.

From operation 516, the routine 500 proceeds to operation 518 where a proxy layer is executed to provide a layer of indirection between the application 106 and certain types of restored resources. Additional details regarding the use of the proxy layer to translate application requests will be provided below with reference to FIG. 6. Once the proxy layer has been instantiated, the routine 500 proceeds to operation 520 where execution of the application 106 is restarted at the point where the application 106 was executing at the time of its suspension. From operation 520, the routine 500 proceeds to operation 522, where it ends.

Figure 6:
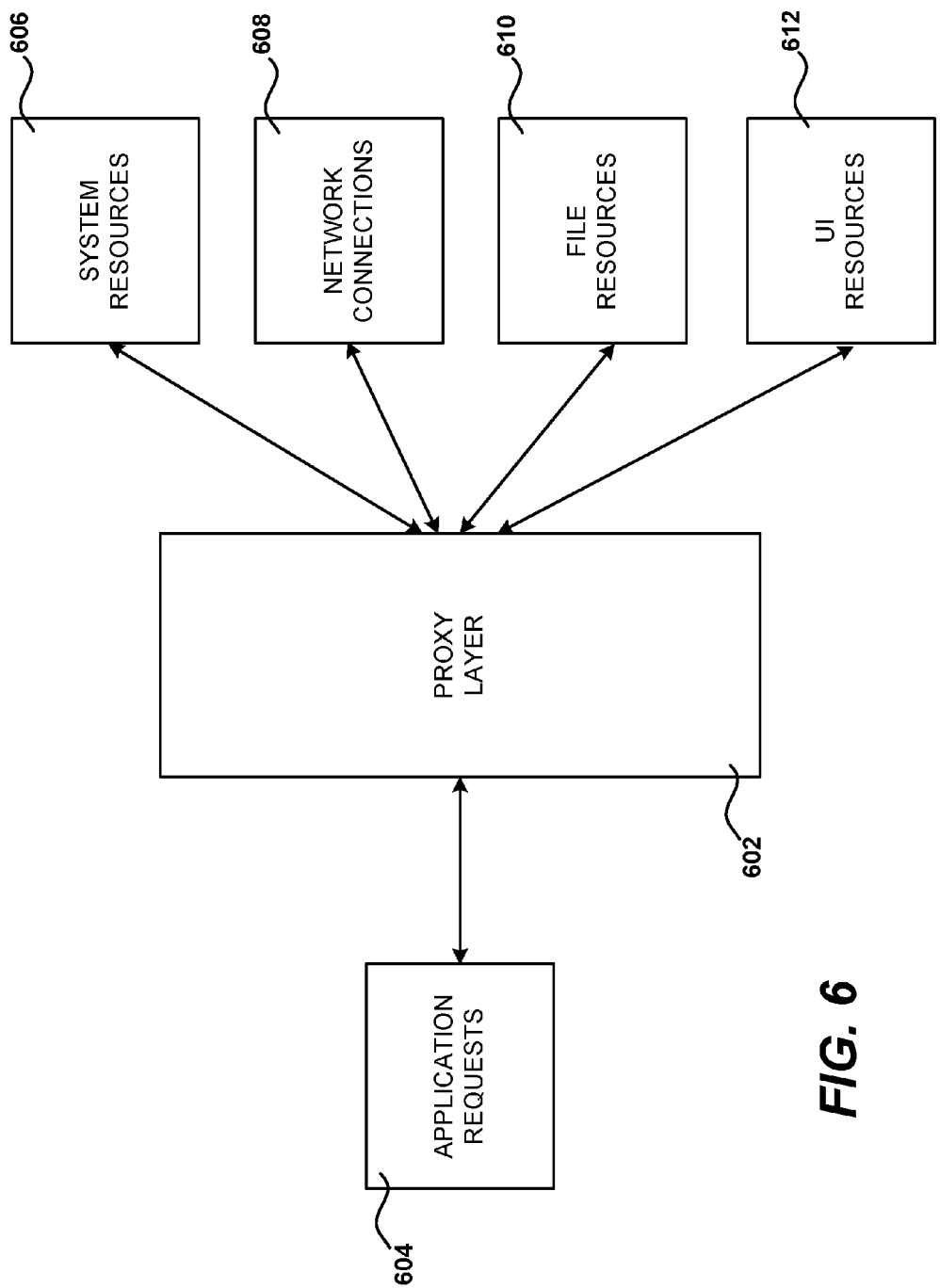
FIG. 6 is a computer software architecture diagram showing aspects of a proxy layer utilized to translate application requests in one embodiment disclosed herein.

FIG. 6 is a computer software architecture diagram showing aspects of a proxy layer 602 utilized to translate application requests 604 in one embodiment disclosed herein. As discussed briefly above, certain system resources may be modified after the runtime state 202 has been created. As a result, when the application 106 is resumed, these resources may be unavailable, renamed, renumbered, or otherwise identified differently. In order to provide access to these resources to the application 106 after it is execution is resumed, a proxy layer 602 is provided. The proxy layer 602 provides a level of indirection between the application 106 and certain other types of resources.

As shown in FIG. 6, the proxy layer 602 receives application requests 604 for certain types of resources, such as the system resources 606, network connections 608, file resources 610, and UI resources 612. The proxy layer 602 translates the application requests 604 so that the application requests 604 are compatible with the locations, names, and other types of identifiers used by system resources when the application 106 is resumed. For instance, a file may be in one location at the time the application 106 is suspended but may be located in another location when the application 106 is resumed. The proxy layer 602 translates application requests 604 for the file at its original location to the new location. As another example, a UI window may be identified by one handle at the time the application 106 is suspended but identified by another handle at the time the application 106 is resumed. The proxy layer 602 will intercept application requests 604 for the window and translate the handles so that the application requests 604 will succeed. Similarly, a network port may be in use by the application 106 at the time it is suspended, but may be unavailable when the application 106 is resumed. The proxy layer 602 will translate the original port number into a new port that is available when the application 106 resumes execution.

It should be appreciated that while the proxy layer 602 has been illustrated in FIG. 6 as translating requests for system resources 606, network connections 608, file resources 610 and UI resources 612, the proxy layer 602 may also translate requests for other types of resources. It should also be appreciated that other types of mechanisms may be utilized in order to ensure that application requests 604 for modified resources can succeed after execution of the application 106 has resumed.

Figure 7:
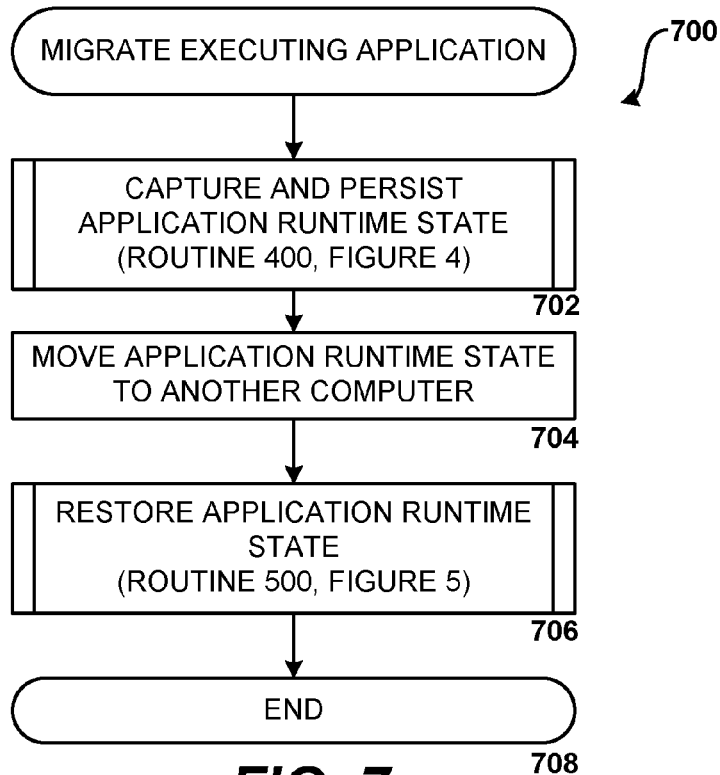
FIG. 7 is a flow diagram showing an illustrative routine for migrating an executing application between two computer systems utilizing the technologies disclosed herein for storing and resuming the runtime state of an application in one embodiment.

FIG. 7 is a flow diagram showing an illustrative routine 700 for migrating an executing application 106 between two computer systems utilizing the technologies disclosed herein for storing and resuming the runtime state 202 of an application 106 in one embodiment. The routine 700 begins at operation 702, where the application runtime state 202 is captured and persisted in the manner described above with reference to FIG. 4.

Once the application runtime state 202 has been persisted, the routine 700 proceeds to operation 704. At operation 704, the runtime state 202 is moved to another computer. This may be desirable for various reasons. For instance, migrating the application runtime state 202 between computers may allow the processing load of the computers to be load balanced without requiring an application 106 to be shut down and restarted on the destination computer. Migration of the application runtime state 202 might also be desirable for other reasons.

Once the runtime state 202 has been migrated to the destination computer, the routine 700 proceeds to operation 706 where the application runtime state 202 is restored at the destination computer in the manner described above with reference to FIG. 5. From operation 706, the routine 700 proceeds to operation 708, where it ends.

Figure 8:
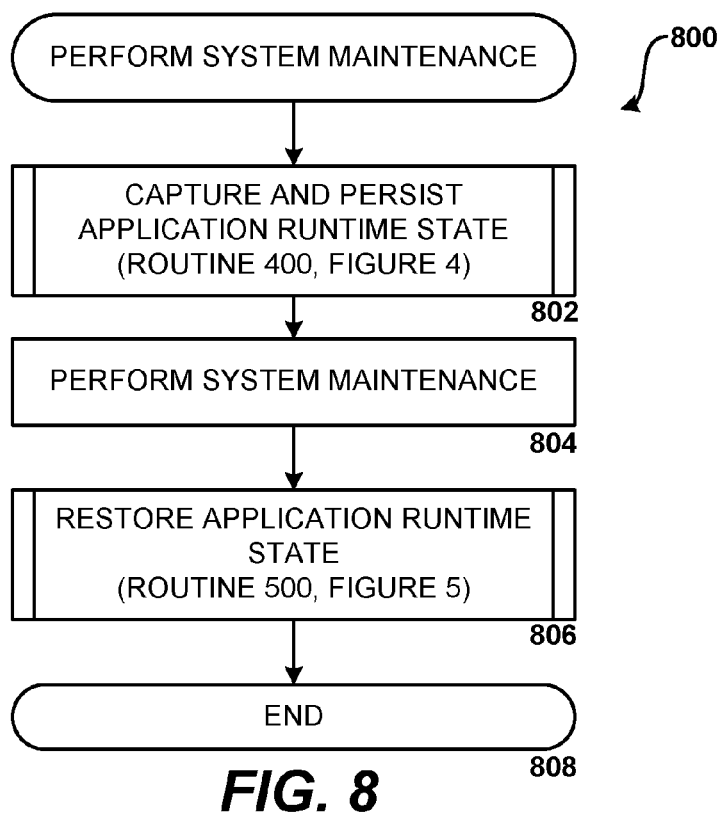
FIG. 8 is a flow diagram showing an illustrative routine for performing maintenance operations on a computer utilizing the technologies disclosed herein for storing and resuming the runtime state of an application in one embodiment.

FIG. 8 is a flow diagram showing an illustrative routine 800 for performing maintenance operations on a computer 108 utilizing the technologies disclosed herein for storing and resuming the runtime state 202 of an application 106 in one embodiment. The routine 800 begins at operation 802, where the runtime state 202 is captured and persisted in the manner described above with reference to FIG. 4. From operation 802, the routine 800 proceeds to operation 804 where system maintenance is performed on the computer 108. For instance, maintenance or upgrades may be performed on the operating system 104 or upon the hardware of the computer 108. Once the maintenance operations have been performed, the routine 800 proceeds to operation 806 where the application runtime state 202 is restored in the manner described above with respect to FIG. 5. From operation 806, the routine 800 proceeds to operation 808, where it ends. It should be appreciated that it may be desirable to suspend and restore the state of an executing application for other reasons than those described above with regard to FIGS. 7-8.

Figure 9:
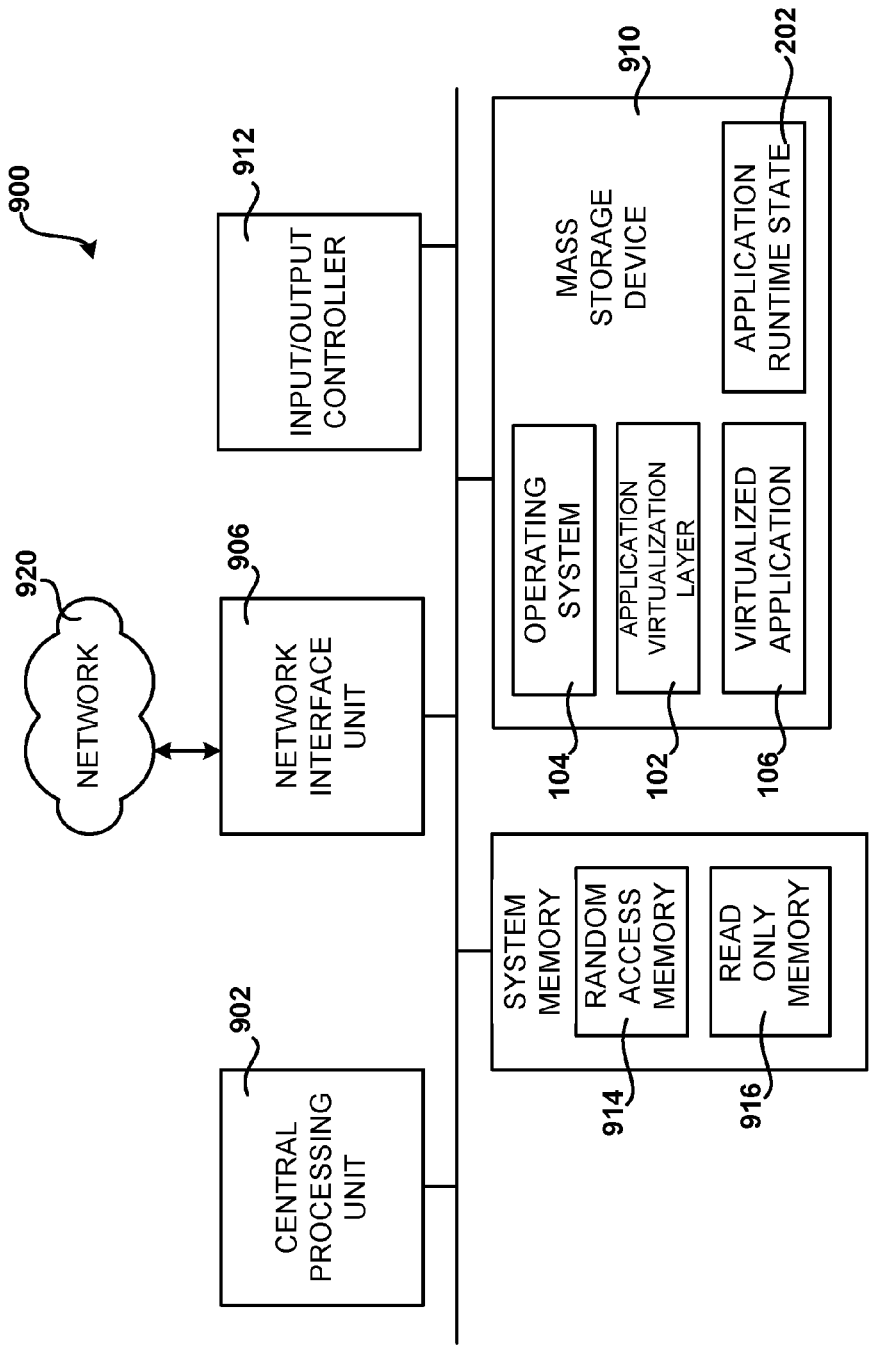
FIG. 9 is a computer architecture diagram showing an illustrative computer hardware and software architecture for a computing system capable of implementing the various embodiments presented herein.

FIG. 9 is a computer architecture diagram showing an illustrative computer hardware and software architecture for a computing system capable of implementing the various embodiments presented herein. The computer architecture shown in FIG. 9 illustrates a conventional desktop, laptop computer, or server computer and may be utilized to execute the various software components described herein.

The computer architecture shown in FIG. 9 includes a central processing unit 902 ("CPU"), a system memory 908, including a random access memory 914 ("RAM") and a read-only memory ("ROM") 916, and a system bus 904 that couples the memory to the CPU 902. A basic input/output system ("BIOS") containing the basic routines that help to transfer information between elements within the computer 900, such as during startup, is stored in the ROM 916. The computer 900 further includes a mass storage device 910 for storing an operating system 918, application programs, and other program modules, which will be described in greater detail below.

The mass storage device 910 is connected to the CPU 902 through a mass storage controller (not shown) connected to the bus 904. The mass storage device 910 and its associated computer-readable storage media provide non-volatile storage for the computer 900. Although the description of computer-readable media contained herein refers to a mass storage device, such as a hard disk or CD-ROM drive, it should be appreciated by those skilled in the art that computer-readable storage media can be any available computer storage media that can be accessed by the computer 900.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 900.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 900 may operate in a networked environment using logical connections to remote computers through a network such as the network 920. The computer 900 may connect to the network 920 through a network interface unit 906 connected to the bus 904. It should be appreciated that the network interface unit 906 may also be utilized to connect to other types of networks and remote computer systems. The computer 900 may also include an input/output controller 912 for receiving and processing input from a number of other devices, including a keyboard, mouse, or electronic stylus (not shown in FIG. 9). Similarly, an input/output controller may provide output to a display screen, a printer, or other type of output device (also not shown in FIG. 9).

As mentioned briefly above, a number of program modules and data files may be stored in the mass storage device 910 and RAM 914 of the computer 900, including an operating system 918 suitable for controlling the operation of a networked desktop, laptop, or server computer. The mass storage device 910 and RAM 914 may also store one or more program modules. In particular, the mass storage device 910 and the RAM 914 may store the virtualized application 106, the application virtualization layer 102, and/or the other software components described above. The mass storage device 910 and RAM 914 may also store other program modules and data, such as the application state 202.

In general, software applications or modules may, when loaded into the CPU 902 and executed, transform the CPU 902 and the overall computer 900 from a general-purpose computing system into a special-purpose computing system customized to perform the functionality presented herein. The CPU 902 may be constructed from any number of transistors or other discrete circuit elements, which may individually or collectively assume any number of states. More specifically, the CPU 902 may operate as one or more finite-state machines, in response to executable instructions contained within the software or modules. These computer-executable instructions may transform the CPU 902 by specifying how the CPU 902 transitions between states, thereby physically transforming the transistors or other discrete hardware elements constituting the CPU 902.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for storing and resuming application runtime state have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising performing computer-implemented operations for:
receiving a request to store a runtime state of an application executing on a computer;
collecting the runtime state of the application independently of a state of an operating system and persisting the runtime state, wherein the runtime state comprises a user interface state of user interface resources when the runtime state is collected, the user interface state including a first handle identifying a first user interface resource at a time the application is suspended;
receiving a request to restore the runtime state of the application;
in response to receiving the request to restore the runtime state of the application, restoring the runtime state of the application and executing the restored application; and
utilizing the runtime state to translate requests from the restored application for resources so that the requests from the restored application are compatible with the resources following the runtime state of the restored application being resumed,
wherein translating the requests from the restored application for the resources comprises translating a request from the restored application for the first handle identifying the first user interface resource at the time the application was suspended, to a second handle identifying a second user interface resource at a time the application is restored and executed.

2. The computer-implemented method of claim 1, further comprising moving the runtime state of the application from the computer to a second computer after persisting the runtime state and prior to restoring the runtime state.

3. The computer-implemented method of claim 2, wherein the runtime state is moved from the computer to the second computer to load balance a processing load of the computer.

4. The computer-implemented method of claim 1, further comprising performing a maintenance operation on the computer after persisting the runtime state and prior to restoring the runtime state.

5. The computer-implemented method of claim 1, wherein the application comprises a virtualized application.

6. The computer-implemented method of claim 5, wherein the runtime state further comprises one or more of memory contents, register context, or instruction pointers.

7. The computer-implemented method of claim 6, wherein the runtime state further comprises one of a system resource state, or a network connection state.

8. The computer-implemented method of claim 7, wherein the runtime state further comprises one or more file resources in use by the application when the runtime state is collected.

9. A computer-readable storage medium having computer-executable instructions stored thereupon which, when executed by a computer, cause the computer to:
receive a request to store a runtime state of an application executing on a computer;
in response to receiving the request, collect the runtime state of the application independently of the state of an operating system and to persist the runtime state, the runtime state of the application comprising a user interface state of user interface resources when the runtime state is collected, the user interface state including a first handle identifying a first user interface resource at a time the application is suspended;
receive a request to restore the runtime state of the application;
restore the runtime state of the application and to execute the restored application; and
utilize the runtime state to translate requests for resources from the executing restored application so that the requests for resources are compatible with the resources that changed after persisting the runtime state of the application,
wherein translating the requests for resources comprises translating a request from the executing restored application for the first handle identifying the first user interface resource at the time the application was suspended, to a second handle identifying a second user interface resource at a time the application is restored and executed.

10. The computer-readable storage medium of claim 9, having further computer-executable instructions stored thereupon which, when executed by the computer, cause the computer to provide a proxy layer for translating requests from the application for one or more resources that changed after the runtime state of the application was persisted.

11. The computer-readable storage medium of claim 10, having further computer-executable instructions stored thereupon which, when executed by the computer, cause the computer to move the runtime state from the computer to a second computer.

12. The computer-readable storage medium of claim 11, wherein the runtime state is moved from the computer to the second computer to load balance a processing load of the computer.

13. The computer-readable storage medium of claim 11, wherein the runtime state is moved from the computer to the second computer to perform a maintenance operation on the computer.

14. The computer-readable storage medium of claim 13, wherein the application comprises a virtualized application.

15. The computer-readable storage medium of claim 14, wherein the runtime state further comprises one of memory contents, register context, or instruction pointers when the runtime state is collected.

16. The computer-readable storage medium of claim 15, wherein the runtime state further comprises one of a system resource state, or a network connection state when the runtime state is collected.

17. The computer-readable storage medium of claim 16, wherein the runtime state further comprises one or more file resources in use by the application when the runtime state is collected.

18. A system comprising:
a first computer having one or more first processors in communication with first memory that executes first programmable code on the one or more first processors to enable
receiving a request at the first computer to store a runtime state of an application executing on the first computer, and
collecting the runtime state of the application independently of a state of an operating system and persisting the runtime state of the application, wherein the runtime state comprises a user interface state of user interface resources when the runtime state is collected, the user interface state including a first handle identifying a first user interface resource at a time the application is suspended; and a second computer having one or more second processors in communication with second memory that executes second programmable code on the one or more second processors to enable receiving a request at the second computer to restore, at the second computer, the runtime state of the application, in response to receiving the request to restore the runtime state of the application, restoring the runtime state of the application on the second computer and executing the restored application thereon, and utilizing the runtime state to translate a request from the executing restored application for the first handle identifying the first user interface resource at the time the application was suspended, to a second handle identifying a second user interface resource at a time the application is restored and executed.

19. The system of claim 18, wherein the runtime state of the application is moved from the first computer to the second computer after persisting the runtime state and prior to restoring the runtime state on the second computer.

20. The system of claim 19, wherein the runtime state is moved from the first computer to the second computer to load balance a processing load of the first computer.

\* \* \* \* \*